United States Patent
Markis

Patent Number: 5,973,574
Date of Patent: Oct. 26, 1999

[54] OSCILLATOR SYSTEM WITH CORRECTIVE FREQUENCY MODULATION

[75] Inventor: William R. Markis, Rochester, N.Y.

[73] Assignee: Eastman Kodak Company, Rochester, N.Y.

[21] Appl. No.: 08/837,633

[22] Filed: Apr. 21, 1997

[51] Int. Cl.⁶ .............................. H04N 1/04; H04N 1/047
[52] U.S. Cl. .............................. 331/65; 331/1 A; 331/17; 358/410; 358/471; 358/480; 358/474; 327/159
[58] Field of Search ..................................... 327/160, 276, 327/277, 159; 331/1 A, 10, 17, 65; 358/410, 471, 480, 474

[56] References Cited

U.S. PATENT DOCUMENTS

| | | | |
|---|---|---|---|
| 3,927,336 | 12/1975 | Carlson et al. | 331/177 R X |
| 3,992,679 | 11/1976 | Isono | 331/1 R |
| 4,268,867 | 5/1981 | Traino | 358/410 |
| 4,320,420 | 3/1982 | Rider . | |
| 4,586,057 | 4/1986 | Schoon . | |
| 5,036,300 | 7/1991 | Nicolai | 331/143 |
| 5,164,843 | 11/1992 | Swanberg | 358/474 |
| 5,243,637 | 9/1993 | Flaherty et al. | 377/95 |
| 5,418,503 | 5/1995 | Glazebrook | 331/167 |
| 5,465,076 | 11/1995 | Yamauchi et al. | 331/179 |
| 5,598,040 | 1/1997 | Markis | 372/9 |

Primary Examiner—Arnold Kinkead
Attorney, Agent, or Firm—Milton S. Sales

[57] ABSTRACT

A stabilized frequency oscillating circuit outputs a pixel clock signal to an image scanner for controlling pixel rate at various writing positions along a scan line. The circuit includes a synchronization circuit having a first control signal component output to adjust a nominal output frequency of the oscillator; and a frequency profiling circuit having a second control signal component output which varies as a function of writing position along the scan line to determine a corrected output frequency of the oscillator which varies as a function of writing position along the scan line.

6 Claims, 3 Drawing Sheets

OSCILLATOR SYSTEM WITH CORRECTIVE FREQUENCY MODULATION

FIELD OF THE INVENTION

This invention relates generally to variable frequency oscillators.

BACKGROUND OF THE INVENTION

Three-color scan lasers are used in high speed digital photofinishing machines that scan images into memory, allow image manipulation, and finally produce hard copy printouts on photosensitive receiver material. FIG. 1 shows a system 10 having three laser sources 12, 13, and 14 that produce red, green, and blue light, respectively. The laser beams pass through respective acousto-optic modulators 16, 17, and 18 that are controlled by a pixel data stream received from printer electronics 20 synchronized by pixel clock signals 22. Laser light beams from the three acousto-optic modulators are optically combined at 24, focused on rotating polygon mirror 26, and swept across a web of receiver material 28 through an f-θ lens 30 to create a print line.

In the field of scan imaging systems, it is often necessary to synchronize the pixel clock to a spatial point relative to the scan line. Typically, this is accomplished by a "start-of-line" signal which is generated by the scanning beam itself passing by a fixed detector. Thus, an accurate relationship between the data path function of time and the physical scan function of space is provided once each scan line. There are several known ways to construct an oscillator which can be synchronized to a start-of-scan signal. Historically, a multiphase crystal oscillator is used because of the inherent frequency stability of crystal oscillators.

Because f-θ lens 30 effects different wavelengths of light differently, the apparent spatial velocity across the receiver material 28 of each of the three laser beams from acousto-optic modulators 16–18 is different from the apparent spatial velocity of the other beams. Further, the velocity of each beam is not constant over the entire sweep, but rather, follows a contouring effect profile. If the pixel clock were constant, the velocity change with position across the sweep will produce different size pixels across the sweep as illustrated in FIG. 2. Differences in apparent spatial velocity across the sweep may be as great as 4% or 5%.

Attempts have been made to compensate for differences in the apparent spatial velocity between beams by adjusting the output rate of crystal oscillators. However, crystal oscillators are very frequency stable relative to time and temperature, they are unsuited for applications wherein the frequency must be varied more than about ½%. This is of course insufficient to compensate for the differences in sweep velocity of 4% to 5% described above.

Oscillators having stabilized frequencies have been produced using phase-lock-loops which comprise a reference oscillator, a voltage-controlled variable frequency oscillator, a frequency divider for adjusting the frequency of the output of the variable frequency oscillator to substantially the same frequency as the output of the reference oscillator, and a phase comparator for comparing the phase of the output of the reference oscillator to the phase of the variable frequency oscillator. The variable frequency oscillator is controlled in response to the compared output. When the frequency divider or multiplier is fixed, the frequency of the variable frequency oscillator is locked, and a signal having that desired frequency can be reliably obtained.

In such prior art locked oscillators, it is possible to change the frequency to which the variable frequency oscillator is to be locked by changing the dividing rate of the frequency divider. However, if the desired frequency to which the variable frequency oscillator is to be locked is relatively great as compared with the output frequency of the reference oscillator, so that the output frequency of the variable frequency oscillator must be divided by a great number, the response time of the frequency divider becomes un-desirably long. The long response time of the frequency divider causes instability in the frequency locking of the variable frequency oscillator, and the large frequency dividing rate requires a complicated and expensive frequency divider.

DISCLOSURE OF THE INVENTION

An object of the present invention is to provide an improved locked oscillator which avoids the above mentioned disadvantages inherent in the locked oscillators of the prior art.

Another object of the present invention is to provide an improved locked oscillator which has a novel frequency control closed loop.

A further object of the present invention is to provide a simple and inexpensive locked oscillator whose locked oscillating frequency can be varied easily and stabilized with a simply constructed frequency control closed loop.

The present invention provides an oscillator circuit that has a long term average accuracy that approximates that of a crystal, has the ability to change frequency within a scan line according to a predetermined function, and is startable on a start-of-scan pulse.

According to one feature of the present invention, a stabilized frequency oscillating circuit outputs a pixel clock signal to an image scanner for controlling pixel rate at various writing positions along a scan line. The circuit includes a variable frequency oscillator having an output frequency determined by a characteristic of an input control signal applied to the oscillator. A frequency profiling circuit is adapted to adjust the characteristic of the input control signal to determine a corrected output frequency of the oscillator, wherein the adjusted control signal characteristic, and thereby the corrected output frequency, vary as a function of writing position along the scan line.

According to another feature of the present invention, the stabilized frequency oscillating circuit includes a synchronization circuit having a first control signal component output to adjust a nominal output frequency of the oscillator; and a frequency profiling circuit having a second control signal component output which varies as a function of writing position along the scan line to determine a corrected output frequency of the oscillator which varies as a function of writing position along the scan line.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. While the invention is described below in the environment of a three-color scan laser system used in high speed digital photofinishing machine, it will be noted that the invention can be used with other systems that would benefit from a variable frequency oscillator.

Figure 1:
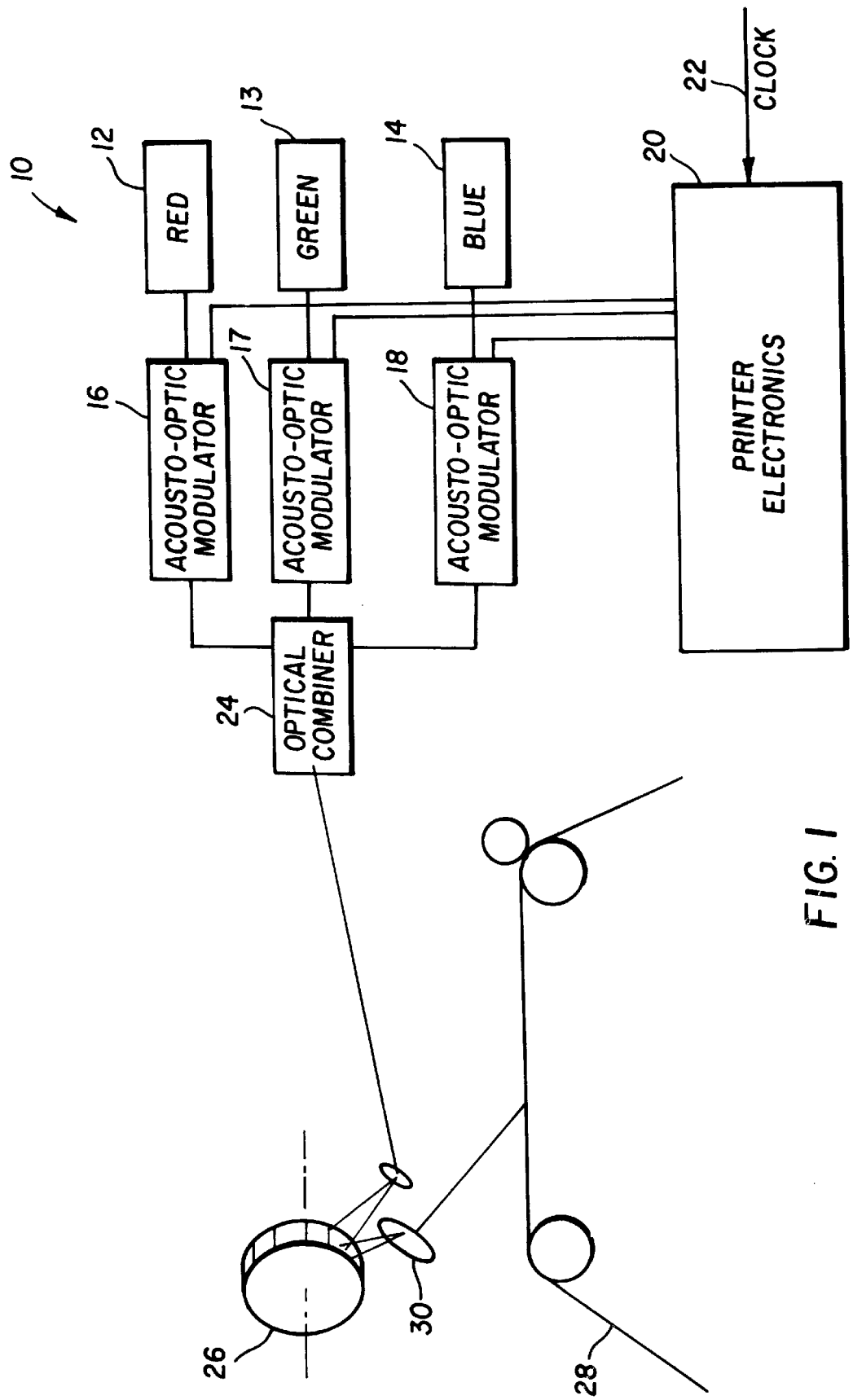
FIG. 1 is a schematic illustration of a laser printer in which an oscillator system according to the present invention is useful.
Figure 2:
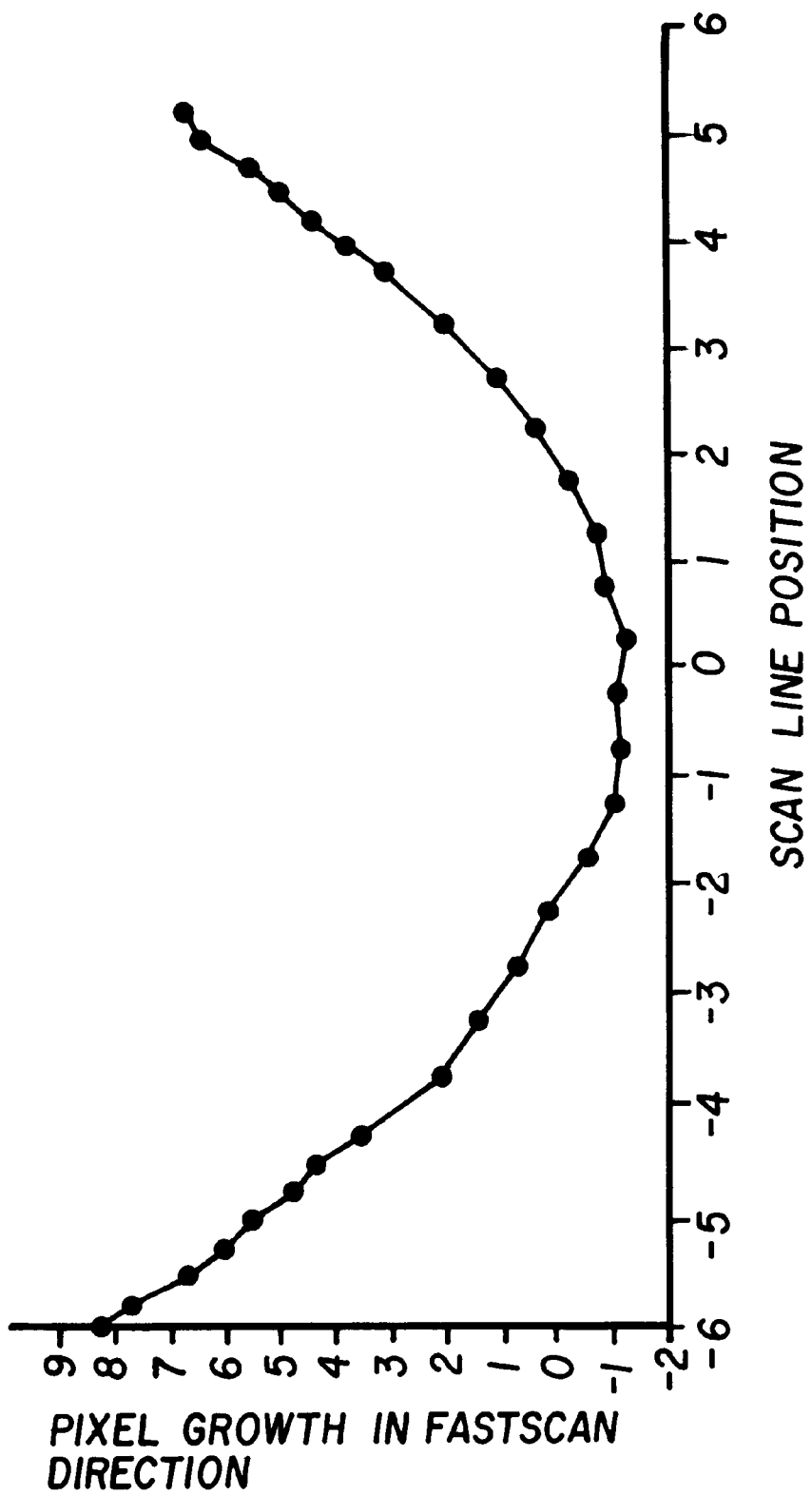
FIG. 2 is a graph of pixel growth as a function of scan line position in un-corrected systems.
Figure 3:
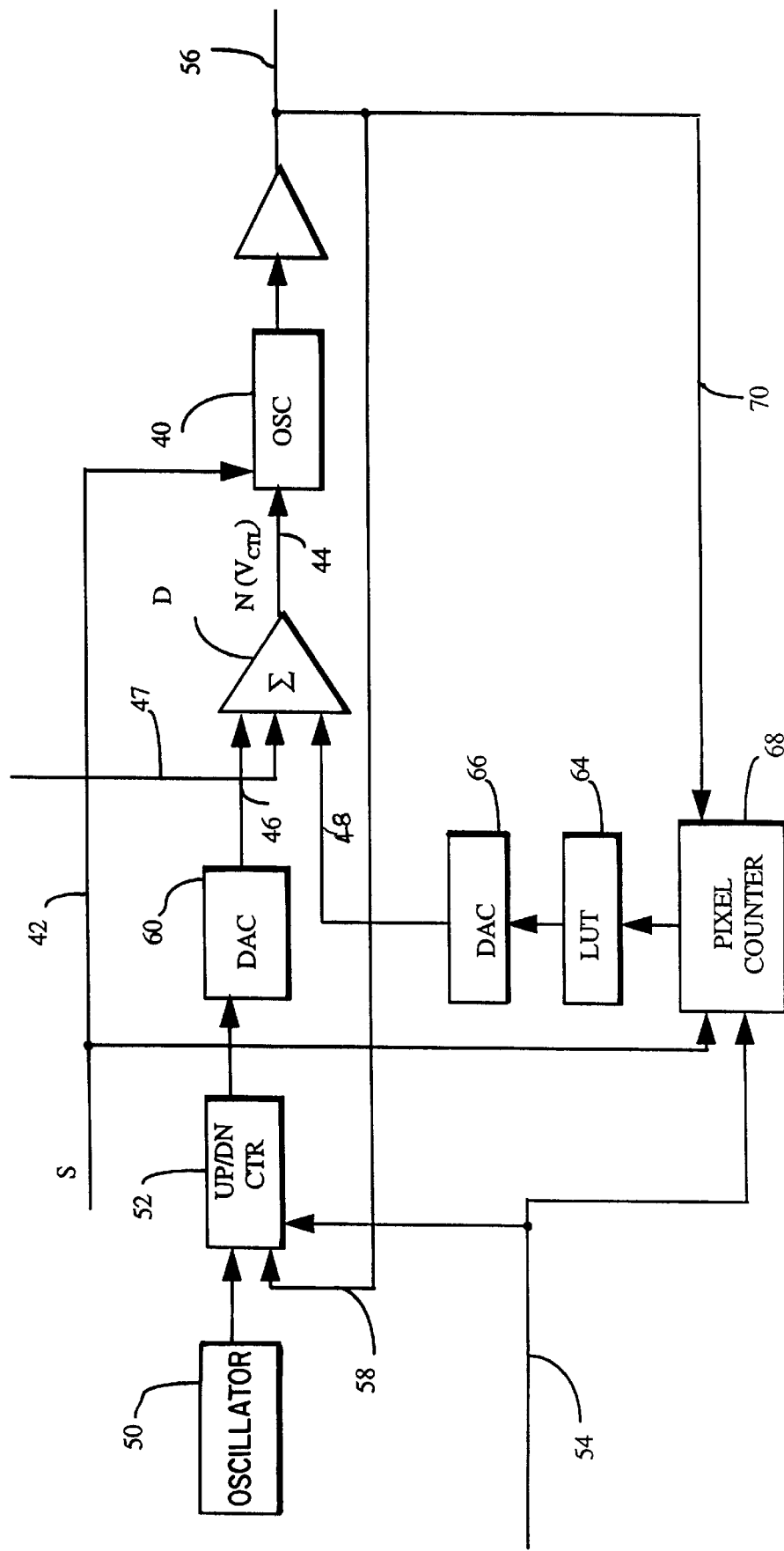
FIG. 3 is a block diagram of an oscillator system according to a preferred embodiment of the present invention.

Referring to FIG. 3, a commercially available edge triggered delay line oscillator 40 receives a start-of-line signal "S" along normally LOW input 42. As discussed above, the start-of-line signal may be generated by the scanning beam itself passing by a fixed detector. When input 42 goes HIGH, oscillator 40 begins to output a predetermined frequency oscillation signal synchronized to the start-of-line signal. The oscillator frequency is proportional over a small range to the value of a control voltage $V_{CTL}$ on an input 44, which is the sum of three voltage inputs 46–48 and which is used to accomplish both frequency locking and inter-line frequency modulation.

Frequency Synchronizing And Locking

A high stability crystal reference oscillator 50, provides some nominal pixel rate. Generally, the nominal pixel rate will be selected as that desired at the center-of-line scan position, although other nominal pixel rates may be used. It will be assumed for purposes of discussion that oscillator 40 is set at the same nominal rate by proper selection of a bias voltage $V_{BIAS}$ on input 47. That is, the value of $V_{BIAS}$ is selected such that the output of oscillator 40 is equal to the output of reference oscillator 50 when inputs 46 and 48 are zero. Reference oscillator 50 feeds a series of pulses to 12-bit up-down counter 52. Upon receipt on input 54 of a frequency lock enable signal HIGH from a host system (not shown), up-down counter 52 will be incremented with each pulse from reference oscillator 50.

At the same time, a pixel clock signal on output 56 is fed back to up-down counter 52 via loop 58 such as to decrement the counter with each output pulse. If the reference frequency is different than the output signal frequency, the counter will have a net increment or decrement. The output of counter 52 is converted to an analog control voltage signal $V_{CONT}$ on voltage input 46 by a digital-to-analog converter 60. If control voltage signal $V_{CONT}$ increases, so will input voltage $V_{CTL}$ to oscillator 40. This has the effect of increasing the oscillator's frequency. If the frequency of oscillator 40 is greater than the reference frequency, counter 52 will decrement. This has the opposite effect, decreasing $V_{CONT}$ and $V_{CTL}$ to thereby decrease the oscillator frequency.

After some period of time, the system will reach an equilibrium point where the frequency of oscillator 40 is the same as that of reference oscillator 50, and counter 52 will receive one down count for each received up count. When this condition is reached, as indicated, say, by lock detection circuitry (not shown) or by simple knowledge of acquisition time, the frequency lock enable signal on input 54 from the host system goes from HIGH to LOW, counter 52 is prevented from changing it's output count. Absent another input, for some period of time until temperature or other variable causes oscillator 40 to drift, the frequency of oscillator 40 will be the same as that of reference oscillator 50. Generally, this frequency will be selected such that it is proper for the center-of-line scan position of the beam, although other frequencies may be selected. If oscillator 40 is synchronized by this process often enough, the drift can be held to within acceptable limits.

Frequency Profiling

A LUT 64, which can be, for example, a random access or programmable memory, holds a set of values associated with each pixel location. The values in LUT 64 may be found by calculation or experimentation, and should generally remain constant for a given optics system. These values, when converted to an analog signal $V_{CORR}$ at 66 and added to $V_{CTL}$ and $V_{CONT}$, will slightly correct oscillator 40 for various positions of the beam along the scan line. Generally, the amount of correction of the oscillator frequency will be up to plus or minus about 2%.

An address value to LUT 64 comes from a pixel counter 68 that starts from the beginning of scan, as indicated by a HIGH start-of-line signal "S" along normally LOW input 42. Pixel counter 68 advances at the pixel rate determined by the reference oscillator, or, as shown, by oscillator 40 along an input 70. A HIGH frequency lock enable signal on input 54 disables pixel counter 68, while a LOW frequency lock enable signal on input 54 indicates that the other loop is inactive and enables the pixel counter. In this manner, the two loops are toggled so that only one of the loops is active at a particular time. Start-of-line signal "S" resets the pixel counter to zero at the beginning of scan.

If the system is set up nominally for center-of-line scan position, $V_{CORR}$ will be zero at the center-of-line scan position, negative before the center-of-line scan position, and positive after the center-of-line scan position.

The invention has been described in detail with particular reference to preferred embodiments thereof, but it will be understood that variations and modifications can be effected within the spirit and scope of the invention.

What is claimed is:

1. A stabilized frequency oscillating circuit which outputs a pixel clock signal to an image scanner for controlling pixel rate at various writing positions along a scan line; said circuit comprising:

a variable frequency oscillator having an output frequency determined by an input control signal applied to the variable frequency oscillator;

a synchronization circuit having a crystal reference oscillator and a first control signal component output, said first control signal component output being applied to the variable frequency oscillator to adjust a nominal output frequency of the variable frequency oscillator; and a frequency profiling circuit having a second control signal component output which varies as a function of writing position along the scan line, said second control signal component output being applied to the variable frequency oscillator to determine a corrected output frequency of the variable frequency oscillator which varies as a function of writing position along the scan line, wherein the synchronization circuit and the frequency profiling circuit are independently and mutually exclusively adjustable so as to not be simultaneously adjustable.

2. A stabilized frequency oscillating circuit as set forth in claim 1, wherein said frequency profiling circuit comprises a look-up table;

having a plurality of stored control signal adjustments; and addressed by the writing position along the scan line.

3. A stabilized frequency oscillating circuit as set forth in claim 1, wherein the crystal reference oscillator has an output frequency selected such as to be proper for a center-of-scanline writing position.

4. A stabilized frequency oscillating circuit which outputs a pixel clock signal to an image scanner for controlling pixel rate at various writing positions along a scan line; said circuit comprising:

a variable frequency oscillator having an output frequency determined by an input control signal applied to the variable frequency oscillator;

a synchronization circuit having a crystal reference oscillator and a first control signal component output, said first control signal component output being applied to the variable frequency oscillator to adjust a nominal output frequency of the variable frequency oscillator;

a frequency profiling circuit having a second control signal component output which varies as a function of writing position along the scan line, said second control signal component output being applied to the variable frequency oscillator to determine a corrected output frequency of the variable frequency oscillator which varies as a function of writing position along the scan line; and a bias circuit having a third control signal component output, said third control signal component output being applied to the variable frequency oscillator to determine the nominal output frequency of the variable frequency oscillator.

5. A stabilized frequency oscillating circuit as set forth in claim 4, further comprising an adder for combining the first, second, and third control signal component outputs.

6. A stabilized frequency oscillating circuit which outputs a pixel clock signal to an image scanner for controlling pixel rate at various writing positions along a scan line; said circuit comprising:

a variable frequency oscillator having an output frequency determined by an input control signal applied to the variable frequency oscillator;

a synchronization circuit having a crystal reference oscillator and a first control signal component output, said first control signal component output being applied to the variable frequency oscillator to adjust a nominal output frequency of the variable frequency oscillator;

a frequency profiling circuit having a second control signal component output which varies as a function of writing position along the scan line, said second control signal component output being applied to the variable frequency oscillator to determine a corrected output frequency of the variable frequency oscillator which varies as a function of writing position along the scan line whereby the synchronization circuit and frequency profiling circuit are independent and mutually exclusively adjustable so as not to be simultaneously adjustable; and an adder for combining the first and second control signal component outputs.

* * * * *